United States Patent
Pugia et al.

(10) Patent No.: US 7,435,381 B2
(45) Date of Patent: Oct. 14, 2008

(54) PACKAGING OF MICROFLUIDIC DEVICES

(75) Inventors: Michael J. Pugia, Granger, IN (US);
James A. Profitt, Goshen, IN (US);
Ronald G. Sommer, Elkhart, IN (US);
Sung-Kwon Jung, Granger, IN (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 169 days.

(21) Appl. No.: 10/447,969

(22) Filed: May 29, 2003

(65) Prior Publication Data

US 2004/0241042 A1 Dec. 2, 2004

(51) Int. Cl.
*G01N 33/48* (2006.01)

(52) U.S. Cl. .................. 422/58; 422/72; 422/100; 422/102; 422/103; 422/104

(58) Field of Classification Search .............. 422/55, 422/56, 58, 72, 73, 82.05, 100, 102–104; 436/165
See application file for complete search history.

(56) References Cited

U.S. PATENT DOCUMENTS

| | | | |
|---|---|---|---|
| 3,798,459 A | 3/1974 | Anderson et al. | 250/218 |
| 3,799,742 A | 3/1974 | Coleman | 23/253 R |
| 3,804,533 A | 4/1974 | Scott | 356/197 |
| 3,856,649 A | 12/1974 | Genshaw et al. | 204/195 |
| 4,310,399 A | 1/1982 | Columbus | 204/195 R |
| 4,534,659 A | 8/1985 | Dourdeville et al. | 366/338 |
| 4,587,220 A | 5/1986 | Mayambala-Mwanika et al. | 436/66 |
| 4,600,507 A | 7/1986 | Shimizu et al. | 210/94 |
| 4,618,476 A | 10/1986 | Columbus | 422/100 |
| 4,676,274 A | 6/1987 | Brown | 137/806 |
| 4,755,472 A | 7/1988 | Ismail et al. | 436/66 |
| 4,908,112 A | 3/1990 | Pace | 204/299 |
| 4,963,498 A | 10/1990 | Hillman et al. | 436/69 |
| 5,024,647 A | 6/1991 | Jubin et al. | 494/37 |
| 5,089,420 A | 2/1992 | Albarella et al. | 436/66 |
| 5,096,836 A | 3/1992 | Macho et al. | |
| 5,160,702 A | 11/1992 | Kopf-Sill et al. | 422/72 |
| 5,164,598 A | 11/1992 | Hillman et al. | 250/341 |
| 5,180,480 A | 1/1993 | Manz | 204/299 R |
| 5,187,104 A | 2/1993 | Corey et al. | 436/86 |
| 5,222,808 A | 6/1993 | Sugarman et al. | 366/274 |
| 5,279,790 A | 1/1994 | Corey et al. | 422/102 |
| 5,296,192 A | 3/1994 | Carroll et al. | 422/56 |
| 5,318,894 A | 6/1994 | Pugia | 435/28 |
| 5,360,595 A | 11/1994 | Bell et al. | 422/56 |
| 5,372,918 A | 12/1994 | Usui et al. | 430/379 |
| 5,424,125 A | 6/1995 | Ballard et al. | 428/364 |
| 5,443,890 A | 8/1995 | Öhman | |

(Continued)

FOREIGN PATENT DOCUMENTS

CA 2323424 3/2005

(Continued)

*Primary Examiner*—Lyle A Alexander
(74) *Attorney, Agent, or Firm*—Harold N. Wells; Norm R. Pollack

(57) ABSTRACT

A microfluidic device containing liquid reagents having an extended shelf life contains the liquid reagents in micro-reservoirs that limit the escape of moisture to less than 10% over the shelf life of the device. The micro-reservoir preferably is made of polypropylene and covered with a metallized plastic film.

12 Claims, 1 Drawing Sheet

U.S. PATENT DOCUMENTS

| | | | |
|---|---|---|---|
| 5,478,751 A | 12/1995 | Oosta et al. | 436/165 |
| 5,571,684 A | 11/1996 | Lawrence et al. | |
| 5,585,069 A | 12/1996 | Zanzucchi et al. | 422/100 |
| 5,631,303 A | 5/1997 | Reinecke | 521/40.5 |
| 5,716,741 A | 2/1998 | Reinecke et al. | 430/8 |
| 5,826,981 A | 10/1998 | Fowler et al. | 366/337 |
| 5,834,314 A | 11/1998 | Gates et al. | 436/52 |
| 5,837,200 A | 11/1998 | Diessel et al. | 422/73 |
| 5,842,787 A | 12/1998 | Kopf-Sill et al. | 366/340 |
| 5,851,776 A | 12/1998 | Valkirs | 435/7.1 |
| 5,866,345 A | 2/1999 | Wilding et al. | 435/7.21 |
| 5,885,527 A | 3/1999 | Buechler | 422/58 |
| 5,912,134 A | 6/1999 | Shartle | 435/7.24 |
| 5,921,678 A | 7/1999 | Desai et al. | 366/336 |
| 5,922,615 A | 7/1999 | Nowakowski et al. | 436/518 |
| 5,932,315 A | 8/1999 | Lum et al. | |
| 5,939,272 A | 8/1999 | Buechler et al. | 435/7.1 |
| 5,942,443 A | 8/1999 | Parce et al. | 436/514 |
| 5,948,227 A | 9/1999 | Dubrow | 204/455 |
| 5,955,028 A | 9/1999 | Chow | 422/63 |
| 5,957,579 A | 9/1999 | Kopf-Sill et al. | 366/340 |
| 5,958,203 A | 9/1999 | Parce et al. | 204/451 |
| 5,958,694 A | 9/1999 | Nikiforov | 435/6 |
| 5,959,291 A | 9/1999 | Jensen | 250/214 R |
| 5,964,995 A | 10/1999 | Nikiforov et al. | 204/450 |
| 5,965,001 A | 10/1999 | Chow et al. | 204/600 |
| 5,965,375 A | 10/1999 | Valkirs | 435/7.2 |
| 5,965,410 A | 10/1999 | Chow et al. | 435/91.2 |
| 5,972,187 A | 10/1999 | Parce et al. | 204/453 |
| 5,976,336 A | 11/1999 | Dubrow et al. | 204/453 |
| 5,985,579 A | 11/1999 | Buechler et al. | 435/7.1 |
| 5,989,402 A | 11/1999 | Chow et al. | 204/601 |
| 5,994,150 A | 11/1999 | Challener et al. | 436/518 |
| 6,001,231 A | 12/1999 | Kopf-Sill | 204/454 |
| 6,002,475 A | 12/1999 | Boyd et al. | 356/246 |
| 6,004,515 A | 12/1999 | Parce et al. | 422/100 |
| 6,011,252 A | 1/2000 | Jensen | 250/214 R |
| 6,012,902 A | 1/2000 | Parce | 417/48 |
| 6,019,944 A | 2/2000 | Buechler | 422/58 |
| 6,024,138 A | 2/2000 | Fritz et al. | |
| 6,030,581 A | 2/2000 | Virtanen | 422/68.1 |
| 6,037,455 A | 3/2000 | Buechler | 530/404 |
| 6,042,709 A | 3/2000 | Parce et al. | 204/453 |
| 6,043,043 A | 3/2000 | Yip | 435/72 |
| 6,046,056 A | 4/2000 | Parce et al. | 436/514 |
| 6,048,498 A | 4/2000 | Kennedy | 422/99 |
| 6,065,864 A | 5/2000 | Evans et al. | 366/167.1 |
| 6,068,752 A | 5/2000 | Dubrow et al. | 204/604 |
| 6,071,478 A | 6/2000 | Chow | 422/81 |
| 6,074,725 A | 6/2000 | Kennedy | |
| 6,080,295 A | 6/2000 | Parce et al. | 204/451 |
| 6,082,891 A | 7/2000 | Schubert et al. | 366/338 |
| 6,086,740 A | 7/2000 | Kennedy | 204/601 |
| 6,086,825 A | 7/2000 | Sundberg et al. | 422/100 |
| 6,090,251 A | 7/2000 | Sundberg et al. | 204/453 |
| 6,100,099 A | 8/2000 | Gordon et al. | 436/518 |
| 6,100,541 A | 8/2000 | Nagle et al. | 250/573 |
| 6,106,779 A | 8/2000 | Buechler et al. | 422/55 |
| 6,107,044 A | 8/2000 | Nikiforov | 435/6 |
| 6,113,855 A | 9/2000 | Buechler | 422/58 |
| 6,123,798 A | 9/2000 | Gandhi et al. | |
| 6,129,826 A | 10/2000 | Nikiforov et al. | 204/450 |
| 6,130,098 A | 10/2000 | Handique et al. | 436/180 |
| 6,132,685 A | 10/2000 | Kercso et al. | 422/104 |
| 6,136,272 A | 10/2000 | Weigl et al. | 422/82.05 |
| 6,136,610 A | 10/2000 | Polito et al. | 436/514 |
| 6,143,576 A | 11/2000 | Buechler | 436/518 |
| 6,148,508 A | 11/2000 | Wolk | 29/825 |
| 6,149,870 A | 11/2000 | Parce et al. | 422/100 |
| 6,150,119 A | 11/2000 | Kopf-Sill et al. | 435/7.1 |
| 6,150,180 A | 11/2000 | Parce et al. | 436/514 |
| 6,156,270 A | 12/2000 | Buechler | |
| 6,170,981 B1 | 1/2001 | Regnier et al. | 366/336 |
| 6,176,119 B1 | 1/2001 | Kintzig | |
| 6,176,991 B1 | 1/2001 | Nordman | 204/601 |
| 6,185,029 B1 | 2/2001 | Ishihara | 359/216 |
| 6,186,660 B1 | 2/2001 | Kopf-Sill et al. | 366/340 |
| 6,187,269 B1 | 2/2001 | Lancesseur et al. | |
| 6,190,034 B1 | 2/2001 | Nielsen et al. | 366/336 |
| 6,207,000 B1 | 3/2001 | Schwobel et al. | |
| 6,235,175 B1 | 5/2001 | Dubrow et al. | |
| 6,238,538 B1 | 5/2001 | Parce et al. | 204/600 |
| 6,241,379 B1 | 6/2001 | Larsen | 366/181.5 |
| 6,251,567 B1 | 6/2001 | Reinecke et al. | 427/581 |
| 6,254,754 B1 | 7/2001 | Ross et al. | 204/548 |
| 6,264,900 B1 | 7/2001 | Schubert et al. | 422/224 |
| 6,268,025 B1 | 7/2001 | Reinecke et al. | 427/581 |
| 6,281,254 B1 | 8/2001 | Nakajima et al. | 516/53 |
| 6,284,113 B1 | 9/2001 | Bjornson et al. | |
| 6,287,520 B1 | 9/2001 | Parce et al. | |
| 6,296,020 B1 | 10/2001 | McNeely et al. | 137/806 |
| 6,319,469 B1 | 11/2001 | Mian et al. | 422/64 |
| 6,321,791 B1 | 11/2001 | Chow | |
| 6,322,683 B1 | 11/2001 | Wolk et al. | |
| 6,379,974 B1 | 4/2002 | Parce et al. | 436/180 |
| 6,399,361 B2 | 6/2002 | Brotherston et al. | 435/283.1 |
| 6,428,664 B1 | 8/2002 | Bhullar et al. | |
| 6,457,854 B1 | 10/2002 | Koop et al. | 366/336 |
| 6,540,896 B1 | 4/2003 | Manz et al. | 204/451 |
| 6,582,662 B1 | 6/2003 | Kellogg et al. | 422/72 |
| 6,632,399 B1 | 10/2003 | Kellogg et al. | 422/72 |
| 6,653,625 B2 | 11/2003 | Andersson et al. | 250/288 |
| 6,709,559 B2 | 3/2004 | Sundbert et al. | 204/604 |
| 6,734,401 B2 | 5/2004 | Bedingham et al. | 219/388 |
| 6,776,965 B2 | 8/2004 | Wyzgol et al. | 422/100 |
| 6,811,752 B2 | 11/2004 | Barbera-Guillem | 422/100 |
| 6,878,555 B2 | 4/2005 | Andersson et al. | 436/180 |
| 2001/0037099 A1 | 11/2001 | Effenhauser | |
| 2001/0042712 A1 | 11/2001 | Battrell et al. | 210/511 |
| 2001/0048900 A1 | 12/2001 | Bardell et al. | 422/100 |
| 2002/0015959 A1 | 2/2002 | Bardell et al. | 435/6 |
| 2002/0023684 A1 | 2/2002 | Chow | |
| 2002/0048535 A1 | 4/2002 | Weigl et al. | 422/100 |
| 2002/0058332 A1 | 5/2002 | Quake et al. | 435/288.3 |
| 2002/0076350 A1 | 6/2002 | Weigl et al. | 422/58 |
| 2002/0079219 A1 | 6/2002 | Zhao et al. | 204/451 |
| 2002/0097632 A1 | 7/2002 | Kellogg et al. | 366/220 |
| 2002/0112961 A1 | 8/2002 | O'Connor et al. | |
| 2002/0114738 A1 | 8/2002 | Wyzgol et al. | 422/100 |

FOREIGN PATENT DOCUMENTS

| | | |
|---|---|---|
| EP | 0 693 560 A2 | 1/1996 |
| EP | 0 693 560 A3 | 1/1997 |
| EP | 1 013 341 A2 | 6/2000 |
| EP | 1 013 341 A3 | 1/2001 |
| EP | 0 871 539 B1 | 2/2002 |
| EP | 1 013 341 B1 | 12/2003 |
| WO | WO 97/00121 | 1/1997 |
| WO | WO 97/01055 | 1/1997 |
| WO | WO 99/46045 A1 | 9/1999 |
| WO | WO 00/21728 | 4/2000 |
| WO | WO 00/22436 | 4/2000 |
| WO | WO 00/25921 | 5/2000 |
| WO | WO 00/34781 A2 | 6/2000 |
| WO | WO 00/34781 A3 | 6/2000 |
| WO | WO 00/36416 A1 | 6/2000 |
| WO | WO 01/12329 A1 | 2/2001 |
| WO | WO 01/14063 A1 | 3/2001 |
| WO | WO 01/14116 A1 | 3/2001 |
| WO | WO 01/19586 A1 | 3/2001 |
| WO | WO 01/54810 A1 | 8/2001 |
| WO | WO 02/18053 A1 | 3/2002 |
| WO | WO 02/28532 A2 | 4/2002 |

PACKAGING OF MICROFLUIDIC DEVICES

BACKGROUND OF THE INVENTION

This invention relates to microfluidic devices that as can be used for carrying out analysis of biological samples, such as blood, urine and the like. More particularly, the invention relates to the materials for such devices and to their construction.

Microfluidic devices have been the subject of many patents and patent applications. The general principles of microfluidic devices of the present invention have been discussed in U.S. patent application Ser. No. 10/082,415 and more specific features of such devices are the subject of other applications. Such microfluidic devices include very small chambers containing liquid or solid reagents which contact liquid samples as they move through the device via capillary passageways, typically by capillary forces or applied centrifugal force (although other means of moving liquid have been disclosed and could be used in some microfluidic devices). After a small sample of liquid is added, the desired quantity of the sample is metered and then passed through one or more chambers where it meets reagents that prepare the sample for subsequent reaction or that react with an analyte in the sample to produce a detectable response, for example, a change in color.

Microfluidic devices have many advantages over the use of dry reagent strips for testing in the near-patient environment. However, the use of very small samples, say up to about 20 microliters, means that the interaction of the sample with the walls of the device is critical to its performance. The sample must be moved in the desired amounts through the capillaries and chambers and must contact dry reagents uniformly, while purging the air that initially filled the spaces in the device. Such problems have been considered in other patent applications and need not be discussed further here. The present invention is concerned with problems related to practical applications of microfluidic devices, particularly those containing liquid or dry reagents and in which ease of use and shelf life of the devices are important to their success.

Microfluidic devices can be made, but then not loaded with reagents agents until the time arrives when they are to be used. Such a method has the advantage of assuring that active reagents are used. However, loading the microfluidic device manually with very small amounts of reagents may be difficult to do with precision and could lead to inaccurate analytical results. Therefore, the present inventors believed that fully-functional microfluidic devices would be preferred by their users. That is, the devices should be pre-loaded with reagents and ready to use with minimal preparation. Doing so introduces significant problems, which will be addressed herein.

It will be evident that a microfluidic device must be keep free of contamination by materials which could prevent it from functioning in its intended manner. It is particularly important to protect the reagents with which the device has been loaded. In some types of analysis, only dry reagents are used. These must be protected from degradation by reaction with the surrounding atmosphere in order to assure that when used, perhaps several years after being manufactured, the reagents perform as intended, providing accurate results. Protection against moisture infiltration is of particular importance.

In other chambers, liquid reagents, diluents, buffers and the like may be loaded into the microfluidic device. Such liquids must be protected from contamination and from change in reagent concentration by loss of solvents and water. An advantage of microfluidic devices is their inherent ability to keep reagents separated until used. Thus, it is important also that liquid reagents not be allowed to migrate from the chambers in which they are loaded. Since the devices are small and the samples and reagents are of the microliter size, it will be evident that packaging of the devices is an important consideration, if they are to have acceptable shelf life and reliably provide accurate results.

The present inventors have considered these problems and propose the solutions presented in the following description.

SUMMARY OF THE INVENTION

The invention relates generally to microfluidic devices having extended shelf life. Dry reagents are placed in the appropriate chambers, where they are protected from contamination and from degradation by contact with moisture. Liquid reagents and the like are placed in micro-reservoirs having a working volume of about 100 μL or less and are sealed within the microfluidic device. The micro-reservoirs are capable of limiting the escape of moisture from such liquids to a rate within 10% or less over the shelf life of the device. In some embodiments, the micro-reservoirs are made of plastics having a low moisture transfer rate and that are thick enough to limit the escape of moisture to the desired level. In other embodiments, the micro-reservoirs are made metal foils, or of plastic films that have been metallized or plastic coated metal foils.

In another aspect, the invention is a method of making microfluidic devices in which micro-reservoirs are placed in predetermined cavities in the base of the device, filled with the desired liquid reagent and finally sealed within the device. When the device is to be used, the micro-reservoirs are opened so that the sealed cavities become chambers filled with the reagents, thus making them available for the analytical procedure for which the device was intended. Various methods may be used to open the micro-reservoirs, including piercing the walls of the micro-reservoirs or rupturing prepared weak spots in the micro-reservoirs.

In a further aspect, the invention is a microfluidic device in which the materials used to make the device prevent transfer of moisture in or out of the device to a rate within 0.01 g/m$^2$/day or less to extend the shelf life of the device. Plastics having a suitably low affinity for moisture are used in thickness capable of limiting moisture transfer to the desired amount. In a preferred embodiment, the base of the device is made of polystyrene having a thickness of at least 2 mm, the top cover of the device is made of foil having a thickness of at least 0.1 mm or polypropylene having a thickness of at least 1 mm. The top cover is adhered to the base with a pressure sensitive adhesive capable of limiting moisture transfer. In preferred embodiments, the moisture content of the device is kept at a low value by including moisture absorbents.

DESCRIPTION OF THE PREFERRED EMBODIMENTS

General Description of Microfluidic Devices

Figure 1:
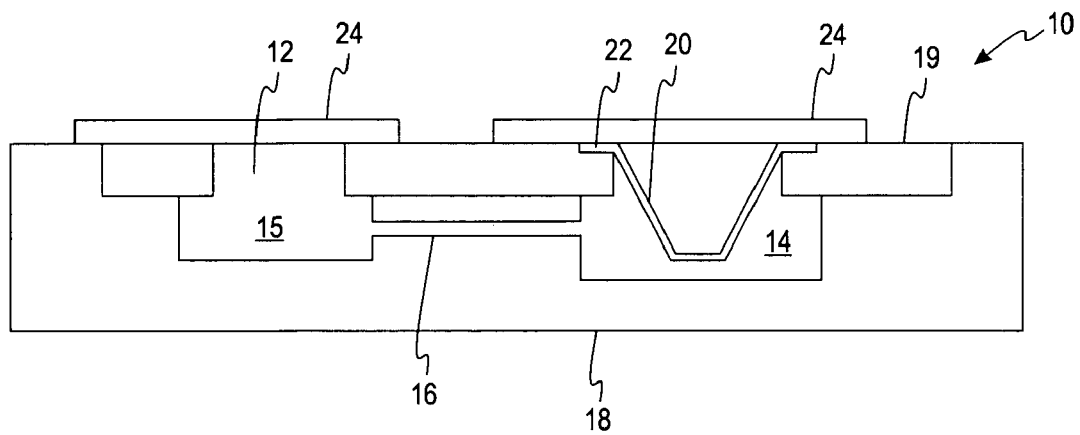
FIG. 1 shows a sectional view through one device of the invention.

Microfluidic devices sometimes are referred to as "chips". They are generally small and flat, typically about 1 to 2 inches square (25 to 50 mm square) or circular discs of similar size (e.g., 25 to 120 mm radius). The volume of samples supplied to the microfluidic chips are typically small, i.e., about 0.3 to 5 μL. The sample liquids are moved through a series of chambers interconnected by capillary passageways having widths in the range of 10 to 500 µm, preferably 20 to 100 µm. The minimum permitted depth of the passageways may be determined by the properties of the sample. For example, the depth typically will be at least 5 µm, but at least 20 µm when whole blood is the sample.

While there are several ways in which the capillaries and sample wells can be formed, such as injection molding, laser ablation, diamond milling or embossing. It is preferred to use injection molding in order to minimize cost while reproducing structural features with high fidelity. Generally, a base portion of the chip will be cut or molded to create cavities that will become the desired network of chambers and capillaries. A top portion will be attached over the base to complete the chip.

With passageways having nominal diameters less than about 200 µm, capillary forces related to the surface energies of the liquid sample and walls predominate. When the walls are wetted by the liquid, the liquid moves through the passageway without external forces being applied. Conversely, when the walls are not wetted by a liquid, the liquid attempts to withdraw from the passageway. These general tendencies are employed to cause a liquid to move through a passageway or to stop moving at the junction with another passageway having a different cross-sectional area. If the liquid is at rest, then it can be moved by applying a force, such as the centrifugal force. Alternatively other means may be used, including air pressure, vacuum, electroosmosis, absorbent materials, additional capillarity and the like, which are able to induce the needed pressure change at the junction between passageways having different cross-sectional areas or surface energies. When the passageways are very small, capillary forces make it possible to move liquids by capillary forces alone, without requiring external forces, except for short periods when a capillary stop must be overcome. However, the smaller passageways inherently are more likely to be sensitive to obstruction from particles in the biological samples or the reagents. Consequently, the surface energy of the passageway walls is adjusted as required for use with the sample fluid to be tested, e.g. blood, urine, and the like.

The capillary passageways may be adjusted to be either hydrophobic or hydrophilic, properties which are defined with respect to the contact angle formed at a solid surface by a liquid sample or reagent. Typically, a surface is considered hydrophilic if the contact angle is less than 90 degrees and hydrophobic if the contact angle is greater than 90°. Preferably, plasma induced polymerization is carried out at the surface of the passageways. Other methods may be used to control the surface energy of the capillary walls, such as coating with hydrophilic or hydrophobic materials, grafting, or corona treatments. The surface energy of the capillary walls may be adjusted, i.e. the degree of hydrophilicity or hydrophobicity, for use with the intended sample fluid.

Movement of liquids through the capillaries may be prevented by capillary stops, which as the name suggests, prevent liquids from flowing through the capillary. A hydrophobic capillary stop is typically a smaller passageway having hydrophobic walls. The liquid is not able to pass through the hydrophobic stop because the combination of the small size and the non-wettable walls results in a surface tension force which opposes the entry of the liquid. The liquid in the sample chamber is prevented from entering the capillary until sufficient force is applied, e.g. centrifugal force, to cause the liquid to overcome the opposing surface tension force and to pass through the hydrophobic passageway.

A hydrophilic stop can also be used, even through the capillary is hydrophilic. Such a stop is wider than the capillary and thus the liquid's surface tension creates a lower force promoting flow of liquid. If the change in width between the capillary and the wider stop is sufficient, then the liquid will stop at the entrance to the capillary stop. Even if the liquid creeps along the hydrophilic walls of the stop, the stop is effective. Alternatively, a hydrophilic stop can be the result of an abrupt narrowing of the passageway so that the liquid does not flow through the narrow passageway until appropriate force, such as centrifugal force, is applied.

Reagents

Microfluidic devices have many potential uses. Of particular interest to the present inventors are medical tests that are carried out near the patient in order to obtain information promptly, without waiting for analytical results from a laboratory. Thus, a medical condition can be diagnosed more rapidly and treatment begun. Many of such tests are carried out on samples of blood and urine, although other types of samples have been tested, including saliva, spinal fluid, gasteric fluids, water, semen, and waste streams. Dry reagents placed on absorbent materials have often been used for such tests, but they have disadvantages. Microfluidic devices are, in theory, able to overcome these disadvantages by using liquid reagents, which can be separated within the device. Such devices may include dry reagents that also are not in contact with other reagents. However, new problems result, which are overcome in the present invention.

It should be understood that the term "reagent" as used here includes both substances that react with components of the sample and those that prepare the sample for subsequent reaction, such as diluents, buffers, and the like. The biological samples may require pretreatment or conditioning before contacting reagents to provide the desired response to an analyte in the sample. For example, washing of a sample with a buffer solution or contacting with a liquid solvent, to separate DNA, proteins or other analytes of interest from the rest of the sample. In other cases, the sample may contact a reagent which removes interfering compounds in the sample, such as trapping intact red blood cells that interfere with color generation. Other pretreatments may include a preliminary reaction with an analyte to improve its subsequent response to a reagent. For example, amplifying the signal generated in response to an analyte. Other pre-treatments and conditioning steps may include mediating, activating and other reactions needed in spectroscopic and electrochemical detection. Liquid reagents include for example, cell lysis buffers, surfactants, biochemicals such as enzymes, proteins, co-factors, and probes, and suspensions of particles, such as labels, enzymes, substrates, metals or polymers.

If a microfluidic device is to have a long shelf life, then the dry reagents must not be degraded by moisture entering from outside the device or from moisture contained in the liquid reagents. If the liquid reagents lose moisture, or other solvents, through the walls of the device, the concentration of these liquids is increased. Therefore, the design and the selection of materials for use in microfluidic devices are very important if the device is to have a long shelf life and perform as intended. In some microfluidic devices, dry reagents will be used. These are usually liquid reagents that have been placed on or in substrates, e.g. absorbent materials and then dried. Examples of substrates include cellulose papers, nitrocellulose, plastic films, polymeric coatings, membranes, glass, porous plastics, polyesters, fibers and porous inorganic media. If the microfluidic device contains only dry reagents, then it is important to maintain them in the dry state until they are ready for use, since by picking up moisture they may lose their effectiveness. Therefore, if a microfluidic device is to have a shelf life of several years, the construction of the device must be such that it limits moisture intrusion. However, when the microfluidic device contains both dry reagents and liquid reagents or conditioning agents, the device contains moisture internally that can create a problem for the shelf life of the dry reagents, and at the same time present difficulties related to the liquid reagents and conditioning agents.

Preventing Moisture Transfer

While in theory microfluidic devices could be made from many materials, in practice plastic materials will be preferred for several reasons. Cost is the most obvious reason, since the devices will generally be used once and then discarded. Plastic materials also are useful for high volume manufacturing since molding methods can reproduce such small devices. Also, they will be less likely to be fragile and easily broken during storage or handling. But, with all these advantages, plastic materials are not universally acceptable. They may interact with the reagents: they may transmit moisture to or from the reagents: or they may interfere with accurate measurement of the response of the reagents to an analyte in the sample.

Plastic materials must not contain solvents or plasticizers or any other compounds which would react with the sample or the reagents to interfere with obtaining an accurate analytical result. For example, traces of solvents, plastic or commonly used mold release agents could cause problems and should be avoided in selecting plastic materials for use in microfluidic devices.

Moisture transmission is a particularly important property in selecting materials since moisture can damage a dry reagent or allow evaporation of a liquid reagent. Thus, the materials should inherently transmit water vapor at a very low rate, since no more than 0.01 mg of water should be added to each 1 mg of a dry reagent over the life of the device. When both types of reagents are loaded into a microfluidic device, which is expected to have a shelf life of several years, movement of moisture must be carefully controlled. Since the dry reagents should not receive more than 0.01 mg of water per mg of the reagent over the useful life of the device, water must be prevented from entering through or from the walls of the device. Also, water must be prevented from migrating from the liquid reagent containers. Achieving both objectives involves the careful selection of barrier materials. In general, plastics should not transmit more than 0.01 g$H_2$O/$m^2$-day, but many plastics cannot meet this requirement, unless a very thick layer of the plastic is used.

Many plastics absorb and retain water, for example polycarbonate. Other plastics that have relatively high water absorption include ABS, acetals, acrylics, acrylonitrile, cellulose acetate, ethyl cellulose, alkylvinylalcohols, polyaryletherketones, polyetheretherketones, polyetherketones, melamine formaldehyde, phenolic (formaldehyde), polyamides (e.g., nylon 6, nylon 66, nylon 12), polyamide-imide, polydicyclopentadiene, polyether-imides, polyethersulfones, polyimides, polyphenyleneoxides, polyphthalamide, methylmethacrylate, polyurethanes, polysulfones, polyethersulfones and vinyl formal.

Although polystyrene absorbs moisture, it is considered acceptable for use in microfluidic devices, since it will absorb much less water than polycarbonate. When saturated, polystyrene will hold about 0.01-0.03% water. Other plastic materials having similar properties are polypropylene, polybutadiene, polybutylene, epoxies, Teflon®, PET, PTFE and chloro-fluoroethylenes, polyvinylidene fluoride, PE-TFE, PE-CTFE, liquid crystal polymers, Mylar®, polyester, LDPE, HDPE, polymethylpentene, polyphenylene sulfide, polyolefins, PVC, and chlorinated PVC. Glass fibers reduce the ability of plastics to hold water, but do not significantly affect water vapor transfer.

Since even the preferred plastic materials transmit moisture to some degree, the thickness chosen will be based on the inherent ability of the plastic to resist transfer of moisture to the desired level, typically about 0.01 g/$m^2$-day. Also, since the plastic materials hold small, but significant amounts of water, even if the device is kept in a low humidity environment, water can migrate inside the device. Consequently, it is preferred that moisture absorbents, such as silica gel, salts, or molecular sieves, are placed within the device to assure that dry conditions are maintained.

Liquid reagents must be isolated by barrier materials which prevent migration of water throughout the device, thus avoiding changes in the concentration through transpiration or evaporation and preventing moisture from reaching the dry reagents. Consequently, the selection of materials used as containers may be even more difficult than selection of materials for the device itself. This is complicated by the need to release liquid reagents when the device is to be used.

The plastic base of most microfluidic devices will be relatively thick, for example about 2 to 8 mm to keep moisture transfer below 0.01 mg of water added for each 1 mg of dry reagent over the shelf life of the device. However, the devices are typically made by cutting or molding the desired features into the base and then covering the face through which the features were cut with a relatively thin layer to complete the device. This top layer will be applied with an adhesive, which also may affect the performance of the device. Moisture transfer through this top layer may be significant. However, it cannot be made too thick since it may be necessary to pierce the top layer in order to introduce the sample that is to be measured. Therefore, the top layer must be thin enough to be pierced easily, but tough enough to withstand handling, while at the same time limiting moisture loss or intrusion. The inventors have found that certain plastic materials meet these requirements. Preferred are polypropylene, polystyrene, PET, polyolefins such as cyclicolefin copolymers, COC, BCOP or LCP, PCTFE, PVC and multilayer materials such PCTFE, PVC, and CPC with polyesters, polyolefins or polyamides should also be appropriate. Other materials which may be used, although not necessarily with equivalent results include polyethylene and polyesters such as Mylar® or SCO. A thickness of about 30 to 600 μm is preferred for most plastic materials. When the preferred polypropylene film is used, the thickness may be about 150 to 300 μm. The moisture transmission of the top layer should be about 0.007 to 0.01 g/$m^2$-day, more generally 0.02 g/m2-day or below.

Another important property of both the top and bottom layers is their optical clarity. When the response of a reagent to the presence or absence of an analyte in the sample is measured as a change in the color or in its intensity, or in emission, absorbence, reflectance, or transmission of energy, the area of the top layer over the measuring point should not interfere with the measurement. For example, if the top layer were to be made of a thin metallized plastic film, such a layer could be easily pierced and it would be a good moisture barrier, but it could not be used over the region in which optical measurements were to be made. Fortunately, the preferred polypropylene film, is acceptable as a moisture barrier in thin films and pierceable, has adequate optical clarity for use over the detection region, especially as thickness increases. Other plastic materials having adequate optical clarity include polystyrene, PET, polyethylene, polyolefin, and polyester, although not all are as satisfactory in other desirable properties as is the preferred polypropylene.

If the top layer is secured to the base with an adhesive, another layer of polymeric material that can affect the operation of the microfluidic device. The adhesive can admit or release moisture through the edges between layers where the adhesive is exposed. In general, it is believed that at least 2 mm should be provided between the edges of the device and chambers that contain reagents in order to limit moisture flow. Some of the adhesive used will typically be in contact with the sample and, since the surface energy of the adhesive will affect the capillary forces acting on the sample, the adhesive chosen must either have suitable surface energy as supplied or it may require modification by chemical additives. Modification of an adhesive's flow properties, film thickness, application time, application pressure and temperature, and hardness may be needed. Although acrylic adhesives have been found to transmit moisture at a higher rate than is desirable, they are preferred for their other properties, including retaining good adhesion over extended periods of time, clearer sealing without forming bubbles, low air leakage, and better compatibility with reagents. Other adhesives which may be used, although not necessarily equivalent to acrylics include silicones and rubber based and modified acrylates.

One useful material for limiting moisture migration is metallized plastic films, related to those used in packaging consumer products. Such films may have a core plastic, e.g., polypropylene, co-extruded with a second plastic that provides a seal on one side and a surface for deposition of metal on the other side. Aluminum is commonly applied by vacuum deposition or other methods that leave a very thin metal film. Other metals, such as copper, silver, and chromium have been suggested for the metal coating. The advantages of such metallized films include their low moisture transmission rate, e.g. 0.001 mg per $m^2$—day, and relatively easy removal or puncture. In the present invention, it is preferred to use such metallized films to seal the inlet ports or other openings in a microfluidic device, such as the vents through which air will be released during use of the device. Another use is to seal the micro-reservoirs that are used to contain liquid reagents or conditioning agents. They may also be used to form the micro-reservoirs in some embodiments of the invention.

Encapsulating Liquid Reagents

Since in many cases, liquid reagents may be needed, a change in concentration by evaporation is a significant problem. Preferably, no more than 10% of the liquid should escape over the life of the device. Also, the liquid reagents must be prevented from moving from their designated chamber until the device is used. There are many possible means by which these requirements might be met. For example, encapsulating the liquid reagent and then releasing it when the device is to be used. There are several practical concerns when implementing encapsulation. First, the size of the reagent volume must be considered. Since there will be only about 1 to 100 microliters, encapsulation of the proper amount is difficult, as is handling and placing the encapsulated reagent in the proper location in the device without rupturing the capsule. Then, opening the capsule when the microfluidic device is to be used is a concern, because the reagent must remain available in the device and in the amount needed to carry out the analysis. One might conclude that it would be best to inject the reagent into the proper well and then place the top layer over the device to prevent the reagent from escaping. However, then some means must be provided to prevent the reagent from diffusing or moving through the capillary passages connecting the reagent chamber with upstream and downstream chambers. One can then consider valving of some type, that can be opened when the device is to be used. Another possibility is blocking the capillary passages with some material, such as a fusible metal that can be removed by heating to provide access to the reagent. Another possibility is to provide a weakened location in a barrier that could be opened by the stress created by centrifugal or mechanical force acting on the reagent when a sample is being moved through the device.

After considering many possible solutions to the problem of maintaining the viability of liquid reagents and conditioning agents over the useful shelf life of a microfluidic device, the present inventors discovered a relatively simple solution to the problems just discussed. They propose to place the liquid reagent in a micro-reservoir positioned as part of or in the appropriate chamber in the device and protect the reagent chamber with a metallized plastic film which can seal against the upper surface. The shape of the micro-reservoir is an important aspect of the invention, since if it filled the chamber it would not be possible to release the reagent completely. Therefore, the micro-reservoir has a void space in the bottom, leaving space for the reagent to flow out of the cup into the chamber. One suitable design is illustrated in FIG. 2. The micro-reservoir 20 is shown as being generally cylindrical because most chambers in the typical microfluidic device will be round, although the shape of the micro-reservoir could be adapted to the shape of the chamber receiving it. The micro-reservoir is tapered so that the bottom can be punctured to release the reagent. The material used generally should satisfy the same requirements for the top layer discussed above. It will not have an adverse effect on the reagent and will be thin enough to be readily pierced to release the reagent. An aluminized plastic film is the preferred material, but others such as a fusible metal, e.g. a Bi/In/Pb/Sn alloy may be used. The micro-reservoir 20 preferably will have a flanged top 22 so that it can rest on the edges of the chamber, as will be seen in the sectional view of a microfluidic device shown in FIG. 1.

Figure 2:
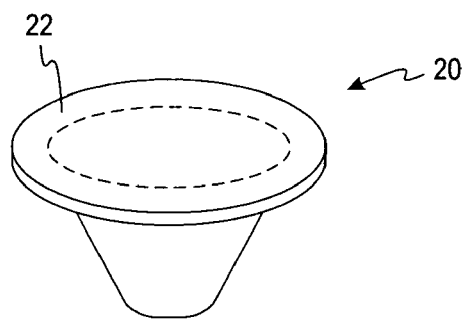
FIG. 2 shows the detail of an encapsulated liquid reagent.

FIG. 1 illustrates in a sectional view a microfluidic device 10 of the invention. In this view only one inlet port 12 is shown and one liquid reagent chamber 14, connected by a capillary passageway 16. It is to be understood that in other devices of the invention the configuration will be more complex, containing additional chambers interconnected by more capillary passageways. The chambers will be connected to vents through which the air is removed as liquid enters. These vents may contain adsorbents or dessicants to remove the small amount of moisture which is present. The base 18 of the device is preferably made of polystyrene, which is optically clear enough to allow reading of visual results of reactions that take place during use and which has a relatively low rate of moisture transfer. However, other materials having similar properties could be used, such as the aluminum coated film described above and plastics providing the necessary moisture barrier. In the configuration shown in FIG. 1, the base 18 is cut away to provide an entry port 12 and inlet chamber 15 for the sample fluid. The inlet chamber communicates reagent chamber 14 through a capillary passageway 16. If the sample liquid is to go immediately into the reagent chamber, the walls of the passageway will be hyrophilic and capillary forces will cause the liquid to be transferred. Alternatively, a capillary stop may be provided in the passageway to prevent movement of the liquid until desired. The capillary stop may be overcome by applying centrifugal force, although other means of moving liquid could be used. The liquid reagent must be isolated from the chamber in which it is to be used. This is done by placing the reagent in a micro-reservoir 20 which prevent the escape of moisture until the device is to be used. In FIG. 1, the micro-reservoir 20 has a flanged top 22 that is seated on the top sheet 19 that covers the inlet and reagent chambers. The micro-reservoir is preferably made of metallized plastic film to assure that microscopic holes in the foil are closed. Aluminum is preferred. It is feasible to use relatively thick plastic films, but they are more difficult to pierce when the liquid reagent is to be released. Similar metallized plastic films 24 are applied after the device has been assembled to cover the inlet port 15 and the reagent chamber 14. When the device is to be used, the foil covers 24 can be pierced to allow introduction of the sample liquid and to release the reagent into its chamber 14, where it can react with the sample after it has been transferred to the reagent chamber. Instead of piercing the cover over the reagent chamber, the liquid could be released by slitting the reagent chamber or applying pressure to rupture it. It is also possible to use a fusible metal that can be melted by local application of heat to release the liquid reagent (or conditioning liquid).

Figure 3:
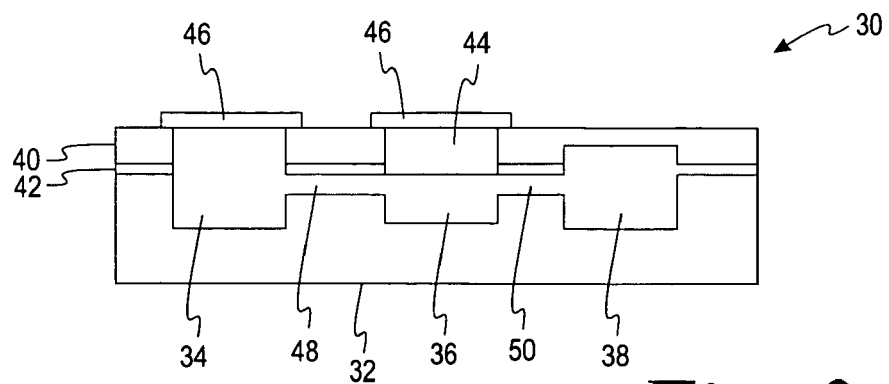
FIG. 3 shows a sectional view of a second device of the invention.

FIG. 3 illustrates in a sectional view, another microfluidic device 30 of the invention. The base 32 has been cut away to form an inlet port 34, a reagent chamber 36, and a detection chamber 38. The top portion 40 has openings over the inlet port 34, the reagent chamber 36, and the detection chamber 38. An adhesive layer 42 is applied to either the base 32 or the top portion 40 to complete the device, except for the reagent micro-reservoir 44 that is suspended by its flanged top from the top layer 40 and covered with foil seal 46 to isolate the liquid reagent within the device. Another foil seal 46 is applied over the inlet port 34.

In use, a sample is placed in the inlet port 34 after forming an opening in foil seal 46. The sample passes through capillary 48 into the reagent chamber to react in chamber 36 with the reagent released from the micro-reservoir 44. The reacted sample passes through capillary 50 into detection chamber 38. The top layer 40 is made of a clear plastic, making possible reading the results of the reaction directly from the detection chamber 38 through the top layer 40.

What is claimed is:

1. A microfluidic device for analysis of biological samples having a shelf life extended by limiting moisture transfer comprising:
   (a) a base layer containing chambers containing dried reagents and interconnected by capillary passageways;
   (b) a top layer over said base layer for enclosing at least some of said chambers containing dried reagents and interconnected capillary passageways;
   (c) an adhesive disposed between said base layer and said top layer for securing said top layer to said base layer; said base layer and said top layer each being of a material having a thickness capable of limiting the transmission of moisture through said base and top layers to less than 0.01 g/m2-day thereby assuring that no more than 0.01 mg of water will be added for each mg of dry reagent over the life of the device, wherein said base layer is of at least one member of the group consisting of polystyrene, polyalkylene, polyolefins, epoxies, PTFE, PET, chloro-fluoroethylenes, polyvinylidene fluoride, PE-TFE, PE-CTFE, polyester, polymethylpentene, polyphenylene sulfide, and PVC and said top layer is of at least one member of the group consisting of polypropylene, PET, polyethylene, polyolefin, polyester, polystyrene and multi-layer materials including PCTFE, PVC, and LPC with polyester, polyolefin or polyamide, and wherein said base and top layers each have a thickness limiting transfer of moisture to less than 0.01 g/m2-day; and
   (d) adhesive covers disposed over chambers containing dried reagents not enclosed by said top layer of (b), thereby enclosing all chambers containing dried reagents.

2. A microfluidic device of claim 1 wherein said adhesive is at least one member of the group consisting of acrylic, silicone, and rubber-based and modified acrylate.

3. A microfluidic device of claim 1, wherein said adhesive covers are metallized plastic film.

4. A microfluidic device of claim 3, wherein said plastic film is metallized with aluminum.

5. A microfluidic device of claim 1 wherein said adhesive cover comprises a fusible metal.

6. A microfluidic device of claim 1 further comprising a liquid reagent prevented from moving through a capillary passage until an analysis is to be carried out.

7. A microfluidic device of claim 6 comprising a micro-reservoir containing a liquid reagent, said micro-reservoir limiting the escape of moisture from said reagent to less than 10% over the shelf life of said device, said micro-reservoir being made of a material having a water absorption equivalent to or less than polystyrene and having a thickness limiting transfer of moisture to less than 0.01 g/m2-day.

8. A microfluidic device of claim 7 wherein said micro-reservoir is made of polypropylene having a thickness of at least 30 μm.

9. A microfluidic device of claim 7 wherein said micro-reservoir is made of metallized plastic film.

10. A microfluidic device of claim 9 wherein said plastic film is metallized with aluminum.

11. A microfluidic device of claim 7 wherein said micro-reservoir has a working volume of 100 μL or less.

12. A microfluidic device of claim 1 further comprising moisture absorbents within said device.

\* \* \* \* \*